US008259825B2

(12) United States Patent
Love et al.

(10) Patent No.: US 8,259,825 B2
(45) Date of Patent: Sep. 4, 2012

(54) MAPPING AND SIGNALING OF COMMON REFERENCE SYMBOLS FOR MULTIPLE ANTENNAS

(75) Inventors: Robert Love, Barrington, IL (US); Tyler Brown, Mundelein, IL (US); Colin Frank, Park Ridge, IL (US); Jialing Liu, Palatine, IL (US); Ravi Nory, Palatine, IL (US); Krishna Kamal Sayana, Arlington Heights, IL (US); Kenneth Stewart, Grayslake, IL (US); Pallav Sudarshan, Waukegan, IL (US); Xiangyang Zhuang, Lake Zurich, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 977 days.

(21) Appl. No.: 12/188,664

(22) Filed: Aug. 8, 2008

(65) Prior Publication Data

US 2010/0034299 A1    Feb. 11, 2010

(51) Int. Cl.
     *H04L 27/28*      (2006.01)
     *H04K 1/10*      (2006.01)
(52) U.S. Cl. ........ 375/260; 375/219; 375/267; 375/295; 375/299
(58) Field of Classification Search ............... 375/260, 375/219, 267, 295, 299
See application file for complete search history.

(56) References Cited

U.S. PATENT DOCUMENTS

| | | | | |
|---|---|---|---|---|
| 7,826,547 | B2 * | 11/2010 | Hansen et al. | 375/267 |
| 2005/0180353 | A1 * | 8/2005 | Hansen et al. | 370/328 |
| 2005/0276347 | A1 * | 12/2005 | Mujtaba et al. | 375/299 |
| 2005/0286562 | A1 | 12/2005 | Nakao et al. | |
| 2006/0251193 | A1 | 11/2006 | Kopmeiners et al. | |
| 2006/0252386 | A1 | 11/2006 | Boer et al. | |
| 2011/0103343 | A1 | 5/2011 | Nishio et al. | |

FOREIGN PATENT DOCUMENTS

| | | |
|---|---|---|
| EP | 1701464 A1 | 9/2006 |
| JP | 2006-014318 A | 1/2006 |
| JP | 2007-525096 A | 8/2007 |
| WO | 2005006588 A2 | 1/2005 |
| WO | 2007036787 A2 | 4/2007 |
| WO | 2009157168 A1 | 12/2009 |

OTHER PUBLICATIONS

3GPP TS 36.211 V8.3.0; 3rd Generation Partnership Project; Technical Specification Group Radio Access Network; Evolved Universal Terrestrial Radio Access (E-UTRA);Physical Channels and Modulation (Release 9); May 2008.
3GPP R1-073376, "E-UTRA DL L1/L2 Control Channel Design—PICH/AICH/D-BCH", Athens Greece, RAN1#50, Aug. 2007.
PCT Search Report mailed Dec. 8, 2009, in Connection With Related PCT Application No. PCT/US2009/050652.
Japan Office Action for Japanese Patent Application No. 2009-179732 dated Feb. 7, 2012, 5 pages.

* cited by examiner

*Primary Examiner* — Ted Wang
(74) *Attorney, Agent, or Firm* — Roland K. Bowler, II; Matthew C. Loppnow

(57) ABSTRACT

A method, a network base station, and a user communication device for transmitting data on an orthogonal frequency-division multiplexing carrier are disclosed. An antenna array may transmit a signal decodable by a legacy user communication device designed for compatibility with a legacy set of transmission antennas. A processor 210 may encode a subframe of the signal with a legacy set of common reference symbols and a supplemental set of common reference symbols referring to the antenna array.

21 Claims, 12 Drawing Sheets

| | SLOT 502 | | | | | | | |
|---|---|---|---|---|---|---|---|---|
| | 0 | 1 | 2 | 3 | 4 | 5 | 6 | 0 |
| 1 | 510 | 514 | 602 | 506 | 512 | 506 | 506 | 510 |
| 2 | 506 | 506 | 606 | 506 | 506 | 506 | 506 | 506 |
| 3 | 506 | 506 | 506 | 506 | 510 | 506 | 506 | 506 |
| 4 | 512 | 516 | 604 | 506 | 510 | 506 | 506 | 512 |
| 5 | 506 | 506 | 506 | 506 | 506 | 506 | 506 | 506 |
| 6 | 506 | 506 | 506 | 506 | 506 | 506 | 506 | 506 |
| 7 | 510 | 514 | 506 | 506 | 512 | 506 | 506 | 510 |
| 8 | 506 | 506 | 506 | 506 | 506 | 506 | 506 | 506 |
| 9 | 506 | 506 | 506 | 506 | 506 | 506 | 506 | 506 |
| 10 | 512 | 516 | 506 | 506 | 510 | 506 | 506 | 512 |
| 11 | 506 | 506 | 506 | 506 | 506 | 506 | 506 | 506 |
| 12 | 506 | 506 | 506 | 506 | 506 | 506 | 506 | 506 |
| 1 | 510 | 514 | 506 | 506 | 512 | 506 | 506 | 510 |

RB 504 (vertical axis)

CONTROL 502

| | SLOT 502 | | | | | | | |
|---|---|---|---|---|---|---|---|---|
| | 0 | 1 | 2 | 3 | 4 | 5 | 6 | 0 |
| 1 | 510 | 514 | 602 | 506 | 512 | 506 | 506 | 510 |
| 2 | 506 | 506 | 606 | 506 | 506 | 506 | 506 | 506 |
| 3 | 506 | 506 | 506 | 506 | 506 | 506 | 506 | 506 |
| 4 | 512 | 516 | 604 | 506 | 510 | 506 | 506 | 512 |
| 5 | 506 | 506 | 608 | 506 | 506 | 506 | 506 | 506 |
| 6 | 506 | 506 | 506 | 506 | 506 | 506 | 506 | 506 |
| 7 | 510 | 514 | 602 | 506 | 512 | 506 | 506 | 510 |
| 8 | 506 | 506 | 606 | 506 | 506 | 506 | 506 | 506 |
| 9 | 506 | 506 | 506 | 506 | 506 | 506 | 506 | 506 |
| 10 | 512 | 516 | 604 | 506 | 510 | 506 | 506 | 512 |
| 11 | 506 | 506 | 608 | 506 | 506 | 506 | 506 | 506 |
| 12 | 506 | 506 | 506 | 506 | 506 | 506 | 506 | 506 |
| 1 | 510 | 514 | 602 | 506 | 512 | 506 | 506 | 510 |

RB 508 (vertical axis); CONTROL 502 (horizontal, spanning slots 0–3)

| | SLOT 502 | | | | | | | |
|---|---|---|---|---|---|---|---|---|
| | 0 | 1 | 2 | 3 | 4 | 5 | 6 | 0 |
| 1 | 510 | 514 | 602 | 506 | 512 | 506 | 506 | 510 |
| 2 | 506 | 506 | 506 | 506 | 506 | 506 | 506 | 506 |
| 3 | 506 | 506 | 506 | 506 | 506 | 506 | 506 | 506 |
| 4 | 512 | 516 | 604 | 608 | 510 | 506 | 506 | 512 |
| 5 | 506 | 506 | 506 | 506 | 506 | 506 | 506 | 506 |
| 6 | 506 | 506 | 506 | 506 | 506 | 506 | 506 | 506 |
| 7 | 510 | 514 | 602 | 606 | 512 | 506 | 506 | 510 |
| 8 | 506 | 506 | 606 | 506 | 506 | 506 | 506 | 506 |
| 9 | 506 | 506 | 506 | 506 | 506 | 506 | 506 | 506 |
| 10 | 512 | 516 | 604 | 608 | 510 | 506 | 506 | 512 |
| 11 | 506 | 506 | 506 | 506 | 506 | 506 | 506 | 506 |
| 12 | 506 | 506 | 506 | 506 | 506 | 506 | 506 | 506 |
| 1 | 510 | 514 | 602 | 606 | 512 | 506 | 506 | 510 |

RB 504 (vertical axis); CONTROL 508 (spans slots 0–2)

| | SLOT 502 | | | | | | | |
|---|---|---|---|---|---|---|---|---|
| | 0 | 1 | 2 | 3 | 4 | 5 | 6 | 0 |
| 1 | 510 | 514 | 506 | 506 | 512 | 506 | 602 | 510 |
| 2 | 506 | 506 | 506 | 506 | 506 | 506 | 606 | 506 |
| 3 | 506 | 506 | 506 | 506 | 506 | 506 | 506 | 506 |
| 4 | 512 | 516 | 506 | 506 | 510 | 506 | 604 | 512 |
| 5 | 506 | 506 | 506 | 506 | 506 | 506 | 608 | 506 |
| 6 | 506 | 506 | 506 | 506 | 506 | 506 | 506 | 506 |
| 7 | 510 | 514 | 506 | 606 | 512 | 506 | 602 | 510 |
| 8 | 506 | 506 | 606 | 506 | 506 | 506 | 606 | 506 |
| 9 | 506 | 506 | 506 | 506 | 506 | 506 | 506 | 506 |
| 10 | 512 | 516 | 506 | 506 | 510 | 506 | 604 | 512 |
| 11 | 506 | 506 | 506 | 506 | 506 | 506 | 608 | 506 |
| 12 | 506 | 506 | 506 | 506 | 506 | 506 | 506 | 506 |
| 1 | 510 | 514 | 602 | 506 | 512 | 506 | 602 | 510 |

RB 504 (vertical axis); CONTROL 508

| | SLOT 502 | | | | | | | |
|---|---|---|---|---|---|---|---|---|
| | 0 | 1 | 2 | 3 | 4 | 5 | 6 | 0 |
| 1 | 510 | 514 | 602 | 506 | 512 | 506 | 606 | 510 |
| 2 | 506 | 506 | 506 | 506 | 506 | 506 | 506 | 506 |
| 3 | 506 | 506 | 506 | 506 | 506 | 506 | 506 | 506 |
| 4 | 512 | 516 | 604 | 506 | 510 | 506 | 608 | 512 |
| 5 | 506 | 506 | 506 | 506 | 506 | 506 | 506 | 506 |
| 6 | 506 | 506 | 506 | 506 | 506 | 506 | 506 | 506 |
| 7 | 510 | 514 | 602 | 506 | 512 | 506 | 606 | 510 |
| 8 | 506 | 506 | 606 | 506 | 506 | 506 | 506 | 506 |
| 9 | 506 | 506 | 506 | 506 | 506 | 506 | 506 | 506 |
| 10 | 512 | 516 | 604 | 506 | 510 | 506 | 608 | 512 |
| 11 | 506 | 506 | 506 | 506 | 506 | 506 | 506 | 506 |
| 12 | 506 | 506 | 506 | 506 | 506 | 506 | 506 | 506 |
| 1 | 510 | 514 | 602 | 506 | 512 | 506 | 606 | 510 |

RB 504 (rows); CONTROL 508

| | SLOT 502 | | | | | | | |
|---|---|---|---|---|---|---|---|---|
| | 0 | 1 | 2 | 3 | 4 | 5 | 6 | 0 |
| 1 | 602 | 606 | 506 | 506 | 604 | 506 | 606 | 602 |
| 2 | 506 | 506 | 506 | 506 | 506 | 506 | 506 | 506 |
| 3 | 506 | 506 | 506 | 506 | 506 | 506 | 506 | 506 |
| 4 | 604 | 608 | 506 | 506 | 602 | 506 | 506 | 604 |
| 5 | 506 | 506 | 506 | 506 | 506 | 506 | 506 | 506 |
| 6 | 506 | 506 | 506 | 506 | 506 | 506 | 506 | 506 |
| 7 | 602 | 606 | 506 | 506 | 604 | 506 | 506 | 602 |
| 8 | 506 | 506 | 606 | 506 | 506 | 506 | 506 | 506 |
| 9 | 506 | 506 | 506 | 506 | 506 | 506 | 506 | 506 |
| 10 | 604 | 608 | 506 | 506 | 602 | 506 | 506 | 604 |
| 11 | 506 | 506 | 506 | 506 | 506 | 506 | 506 | 506 |
| 12 | 506 | 506 | 506 | 506 | 506 | 506 | 506 | 506 |
| 1 | 602 | 606 | 506 | 506 | 604 | 506 | 506 | 602 |

(Rows labeled with RB 504; columns under CONTROL 508)

| | RB1 | RB2 | RB3 | RB4 | RB5 | • • | RB25 | |
|---|---|---|---|---|---|---|---|---|
| 6 | 1108 | 1102 | 1102 | 1102 | 1108 | • • | 1108 | |
| 5 | 1108 | 1102 | 1102 | 1102 | 1108 | • • | 1108 | |
| 4 | 1106 | 1106 | 1106 | 1106 | 1106 | • • | 1106 | SLOT 502 |
| 3 | 1108 | 1102 | 1102 | 1102 | 1108 | • • | 1108 | |
| 2 | 1108 | 1102 | 1102 | 1102 | 1108 | • • | 1108 | |
| 1 | 1108 | 1102 | 1102 | 1102 | 1108 | • • | 1108 | |
| 0 | 1108 | 1102 | 1102 | 1102 | 1108 | • • | 1108 | |
| 6 | 1108 | 1102 | 1102 | 1102 | 1108 | • • | 1108 | |
| 5 | 1108 | 1102 | 1102 | 1102 | 1108 | • • | 1108 | |
| 4 | 1108 | 1106 | 1106 | 1106 | 1106 | • • | 1106 | SLOT 502 |
| 3 | 1108 | 1102 | 1102 | 1102 | 1108 | • • | 1108 | |
| 2 | 1104 | 1104 | 1104 | 1104 | 1104 | • • | 1104 | |
| 1 | 1104 | 1104 | 1104 | 1104 | 1104 | • • | 1104 | |
| 0 | 1104 | 1104 | 1104 | 1104 | 1104 | • • | 1104 | |

|     | 0   | 1   | 2   | 3   | 4   | 5   | 6   |
|-----|-----|-----|-----|-----|-----|-----|-----|
| 1   | 510 | 514 | 506 | 506 | 512 | 506 | 506 |
| 2   | 506 | 506 | 506 | 506 | 506 | 506 | 506 |
| 3   | 506 | 506 | 506 | 506 | 506 | 506 | 506 |
| 4   | 512 | 516 | 506 | 506 | 510 | 506 | 506 |
| 5   | 506 | 506 | 602 | 506 | 506 | 506 | 506 |
| 6   | 506 | 506 | 604 | 506 | 506 | 506 | 506 |
| 7   | 510 | 514 | 606 | 506 | 512 | 506 | 506 |
| 8   | 602 | 506 | 608 | 506 | 506 | 506 | 506 |
| 9   | 604 | 506 | 506 | 506 | 506 | 506 | 506 |
| 10  | 512 | 516 | 506 | 506 | 510 | 506 | 506 |
| 11  | 606 | 506 | 506 | 506 | 506 | 506 | 506 |
| 12  | 608 | 506 | 506 | 506 | 506 | 506 | 506 |

CCE1 1202 — column 0
CCE2 1204 — column 2

MAPPING AND SIGNALING OF COMMON REFERENCE SYMBOLS FOR MULTIPLE ANTENNAS

FIELD OF THE INVENTION

The present invention relates to a method and system for transmitting data over a Long Term Evolution carrier connection. The present invention further relates to mapping and signaling common reference symbols.

INTRODUCTION

The Third Generation Partnership Project (3GPP) is developing a Long Term Evolution LTE) carrier using a physical layer based on globally applicable evolved universal terrestrial radio access (E-UTRA). In release-8 of LTE, an LTE base station, referred to as an enhanced Node-B (eNB), may use an array of four antennas to broadcast a signal to a piece of user equipment. The antennas may be a physical antenna or a combination of radiating elements comprising a "virtual" antenna. The signal may be encoded with four common reference symbols representing each of the four antennas. The common reference symbol may provide a phase reference for coherent demodulation and a benchmark for signal strength comparisons between base stations. The user equipment may use the signal strength comparison to determine the appropriate time for a handoff or, for the purpose of channel quality estimation, in support of link adaption. The common reference symbol may also be used by user equipment for the purpose of determination of a preceding matrix recommendation to be applied by the base station.

SUMMARY OF THE INVENTION

A method, a network base station, and a user communication device for transmitting data on an orthogonal frequency-division multiplexing carrier are disclosed. An antenna array may have a legacy set of transmission antennas and a supplemental set of transmission antennas that transmit a signal decodable by a legacy user communication device designed for compatibility with the legacy set of transmission antennas. A processor may encode a sub frame of the signal with a legacy set of common reference symbols referring to the legacy set of transmission antennas and a supplemental set of common reference symbols referring to the supplemental set of transmission antennas.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 5 illustrates, in a block diagram, a traditional common reference symbol mapping of a signal broadcast from a four transmission antenna configuration.

FIG. 6 illustrates, in a block diagram, a first embodiment of common reference symbol mapping of a signal broadcast from an eight transmission antenna configuration.

FIG. 7 illustrates, in a block diagram, a second embodiment of common reference symbol mapping of a signal broadcast from an eight transmission antenna configuration.

FIG. 8 illustrates, in a block diagram, a third embodiment of common reference symbol mapping of a signal broadcast from an eight transmission antenna configuration.

FIG. 9 illustrates, in a block diagram, a fourth embodiment of common reference symbol mapping of a signal broadcast from an eight transmission antenna configuration.

FIG. 10 illustrates, in a block diagram, one embodiment of an alternating common reference symbol mapping of a signal broadcast from an eight transmission antenna configuration.

FIG. 11 illustrates, in a block diagram, one embodiment of a common reference symbol mapping to a physical resource block for an eight transmission antenna configuration.

FIG. 12 illustrates, in a block diagram, one embodiment of a common reference symbol mapping to a control channel element for an eight transmission antenna configuration.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a network base station, and a user communication device for transmitting data on an orthogonal frequency-division multiplexing carrier are disclosed. An antenna array may have a legacy set of transmission antennas and a supplemental set of transmission antennas that transmit a signal decodable by a legacy user communication device designed for compatibility with the legacy set of transmission antennas. A processor may encode a sub frame of the signal with a legacy set of common reference symbols referring to the legacy set of transmission antennas and a supplemental set of common reference symbols referring to the supplemental set of transmission antennas.

Figure 1:
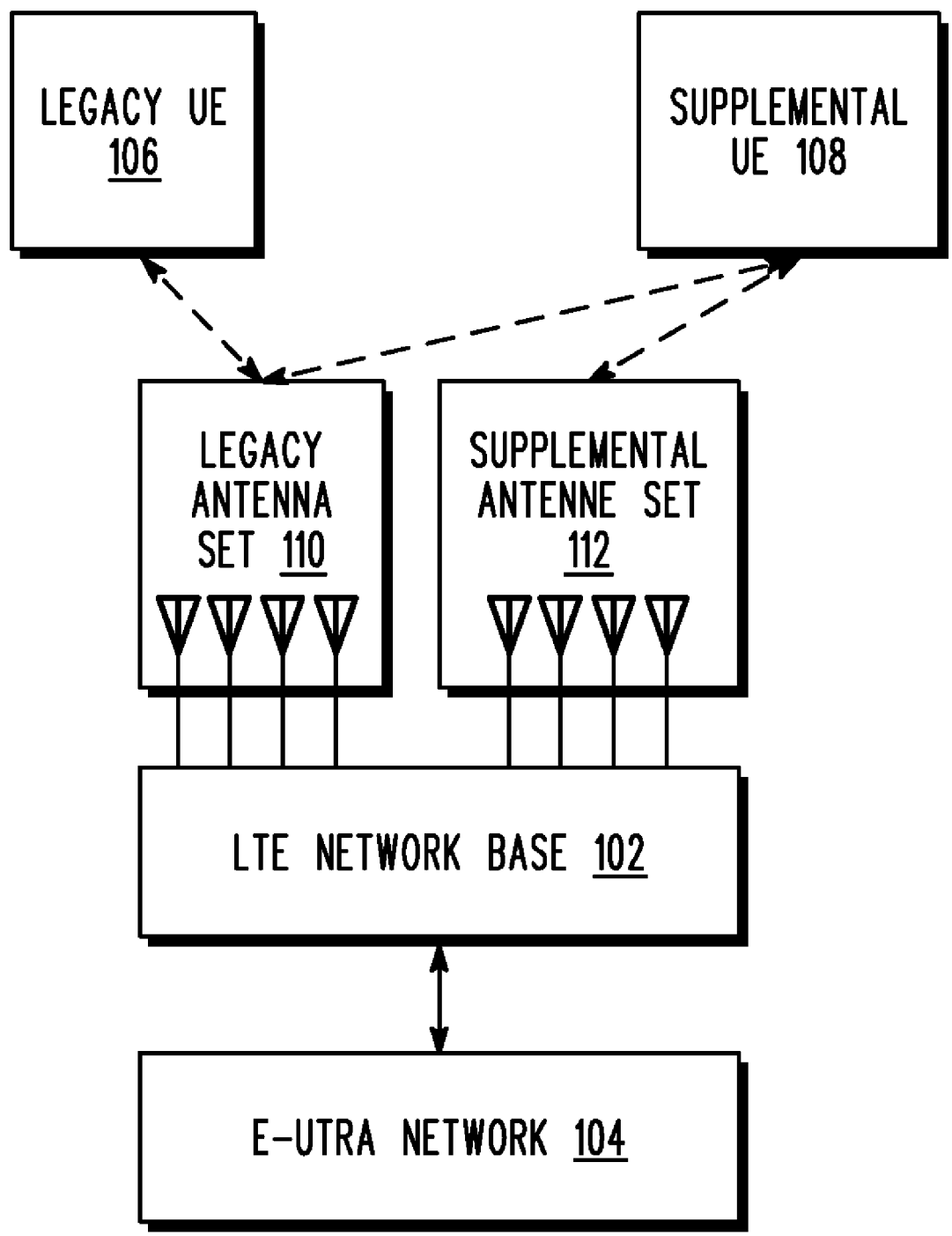
FIG. 1 illustrates one embodiment of a communication system.

FIG. 1 illustrates one embodiment of a Long Term Evolution (LTE) carrier communication system 100. A LTE carrier network base 102 may provide access to a network 104 for a variety of LTE user equipment (UE). Various communication devices may exchange data or information through the network 104. The network 104 may be an evolved universal terrestrial radio access (E-UTRA), or other type of telecommunication network. For one embodiment, the base station 104 may be a distributed set of servers in the network.

The LTE UE may be one of several types of handheld or mobile devices, such as, a mobile phone, a laptop, or a personal digital assistant (PDA). For one embodiment, the LTE UE may be a WiFi® capable device, a WiMAX® capable device, or other wireless devices. The LTE UE may be a legacy UE device 106, such as LTE release 8, or a supplemental LTE UE device 108. The legacy UE device 106 may access the network 104 by creating a signal connection with a transmit configuration of a legacy antenna set 110 with a designated number of antennas, such as four for LTE release 8, for a closed loop spatial multiplexing. The legacy UE device 106 may access the network 104 by creating a signal connection with an antenna array having a transmit configuration of both the legacy antenna set 110 and a supplemental antenna set 112 with a designated total number of antennas, such as eight, for a closed loop spatial multiplexing. The legacy antenna set 110 may refer to an antenna set having the number of antennas used by the legacy device 106, with the supplemental antenna set 112 referring to any antennas beyond the legacy antenna set 110. The legacy antenna set 110 need not have been built prior to the supplemental antenna set 112.

Figure 2:
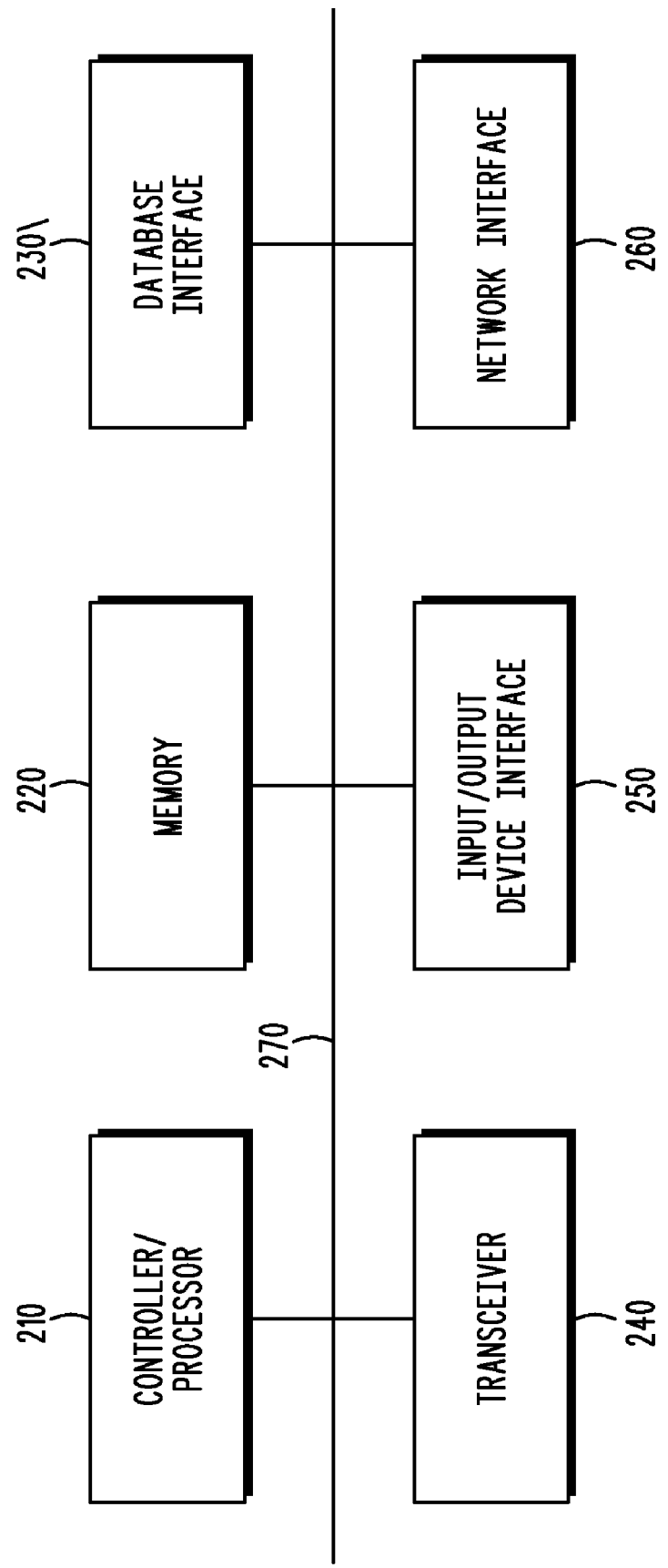
FIG. 2 illustrates a possible configuration of a computing system to act as a base station.

FIG. 2 illustrates a possible configuration of a computing system to act as a base station 102. The base station 102 may include a controller/processor 210, a memory 220, a database interface 230, a transceiver 240, input/output (I/O) device interface 250, and a network interface 260, connected through bus 270. The base station 102 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM, digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect the legacy UE device 106 and the supplemental UE device 108 to the network 104.

The transceiver 240 may create a data connection with the legacy UE device 106 and the supplemental UE device 108. The transceiver may use the legacy antenna set 110 and the supplemental antenna set 112 to create a downlink and uplink control channel and a downlink and uplink data channel between the base station 102 and the legacy UE device 106 and the supplemental UE device 108.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 104. The network connection interface 260 may be used to connect a client device to a network. The network connection interface 260 may be used to connect the teleconference device to the network connecting the user to other users in the teleconference. The components of the base station 102 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station 102 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
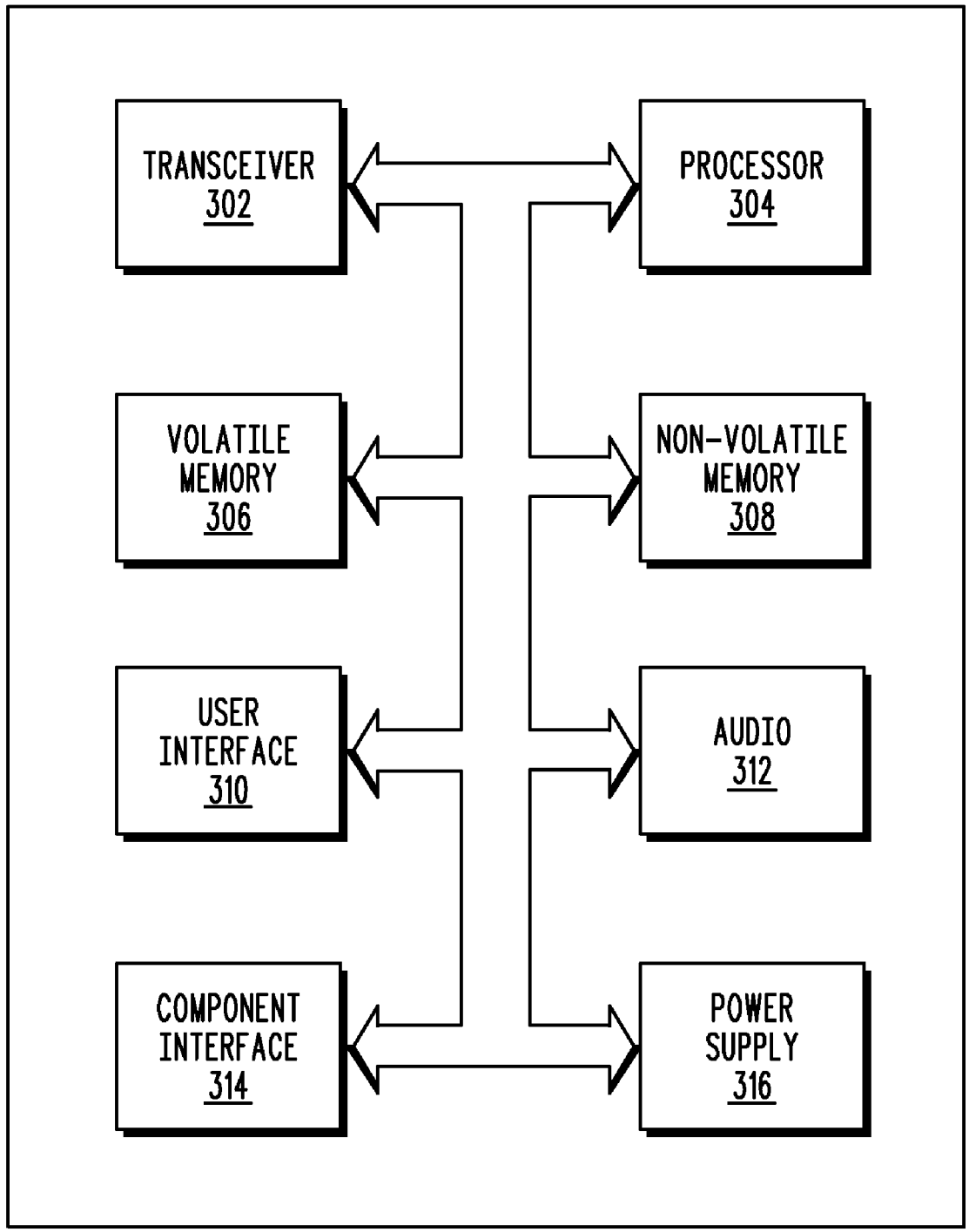
FIG. 3 illustrates in a block diagram one embodiment of the user communication device.

FIG. 3 illustrates in a block diagram one embodiment of a user communication device 300, or terminal, capable of acting as either a legacy UE device 106 or a supplemental UE device 108. The UE 300 may be capable of accessing the information or data stored in the network 104. For some embodiments of the present invention, the UE 300 may also support one or more applications for performing various communications with the network 104. The UE 300 may be a handheld device, such as, a mobile phone, a laptop, or a personal digital assistant (PDA). For some embodiments of the present invention, the UE 300 may be WiFi® capable device, which may be used to access the network 104 for data or by voice using VOIP.

The UE 300 may include a transceiver 302, which is capable of sending and receiving data over the network 104. The UE 300 may include a processor 304 that executes stored programs. The UE 300 may also include a volatile memory 306 and a non-volatile memory 308 which are used by the processor 304. The UE 300 may include a user input interface 310 that may comprise elements such as a keypad, display, touch screen, and the like. The UE 300 may also include a user output device that may comprise a display screen and an audio interface 312 that may comprise elements such as a microphone, earphone, and speaker. The UE 300 also may include a component interface 314 to which additional elements may be attached, for example, a universal serial bus (USB) interface. Finally, the UE 300 may include a power supply 316.

The base station 102 may use an orthogonal frequency-division multiplexing (OFDM) signal to execute closed loop spatial multiplexing. The OFDM signal may be a series of OFDM symbols. A subframe may be a fixed number of contiguous OFDM symbols, such as twelve or fourteen OFDM symbols. Generally in LTE, forms of closed loop spatial multiplexing, open loop spatial multiplexing, or transmit diversity may use four transmission antennas represented by four common reference symbol (CRS) patterns for per antenna channel estimation. Newer methods of spatial multiplexing and transmit diversity may use eight transmission antennas represented by eight CRS patterns. However, these eight CRS pattern signals may be arranged to be decodable by legacy LTE UE devices 106 or designed to be compatible with a legacy number of transmission antennas to function with a base station 102 running the newer methods of spatial multiplexing and transmit diversity. A special frame bitmap, or other means of indicating the state or format of a subframe, may indicate which subframes in a set of K subframes have a special format. The special format may have an initial or other subset of the symbols be a unicast control region while the remaining symbols may have some special characteristic different from a normal unicast subframe or in a format not recognizable or decodable by the set of legacy terminals. For example, one special subframe format may have eight CRS to support eight antenna physical downlink share channel (PDSCH) transmissions using closed loop spatial multiplexing. The rest of the subframes support may support four transmit antennas.

Figure 4:
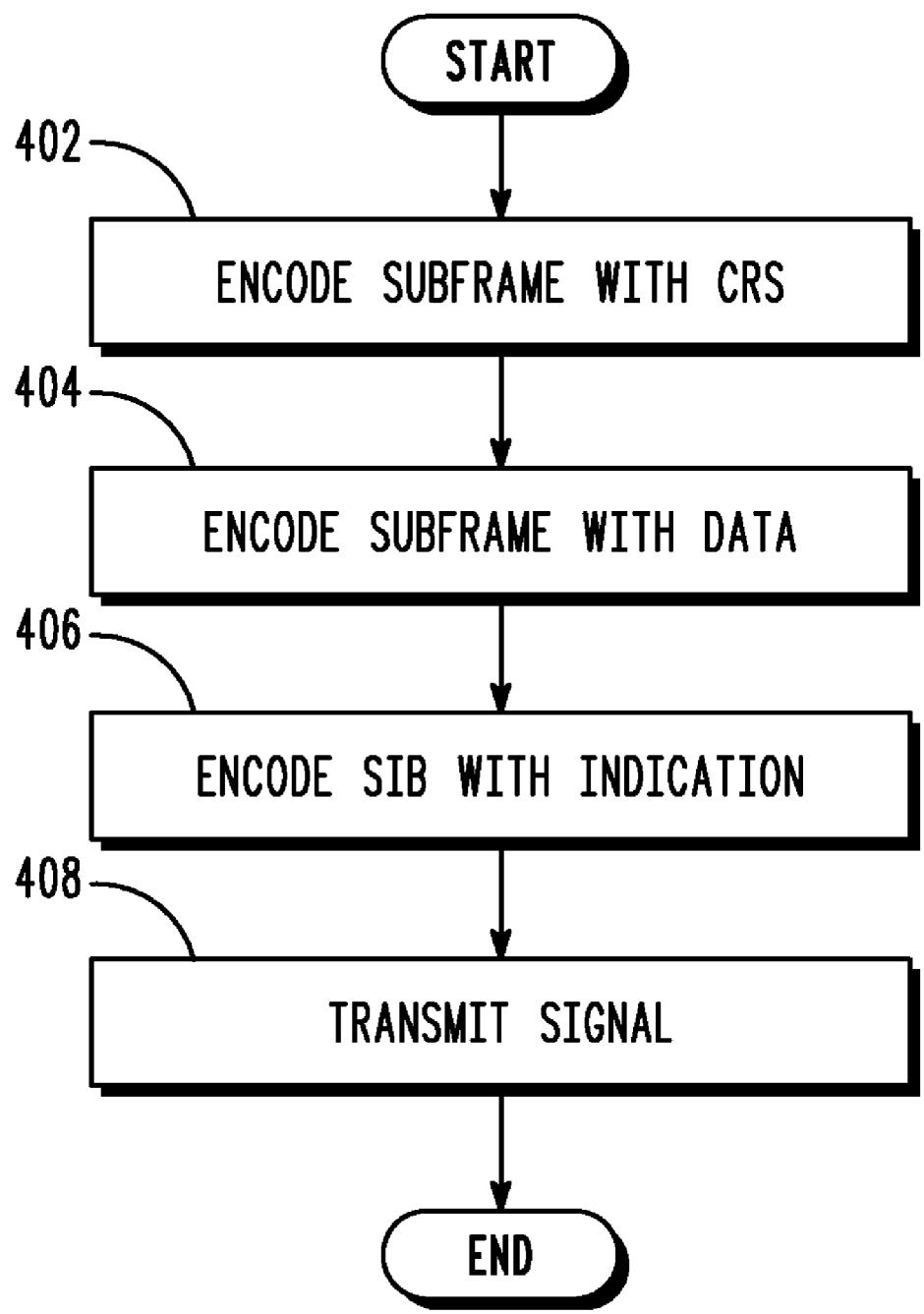
FIG. 4 illustrates, in a flowchart, one method for encoding a subframe for transmission on an enhanced transmit configuration.

FIG. 4 illustrates, in a flowchart, one method 400 for encoding a subframe for transmission on an enhanced transmit configuration. The base station 102 may encode a subframe for transmission with a set of CRSs for each of the antenna used in the transmit configuration (Block 402). The base station 102 may further encode the subframe with data (Block 404). The base station 102 may encode a system information block (SIB) on the broadcast control channel (BCCH) to signal a special frame bitmap or other indication of the status of individual subframes to indicate the number of transmission antennas used (Block 406). For example, the special frame bitmap may indicate the subframe state is LTE release 8, LTE release 10, multimedia broadcast multicast service release 8, an eight CRS mapped signal, a multimedia broadcast multistate release 10, multistate broadcast multistate service release 10 plus relays, or other configuration. The base station 102 may transmit the signal after all the encoding is completed (Block 408). The subframe status indicator, such as a special frame bitmap, may be delivered by a dedicated control channel signaling to specific terminals. The subframe status indicator may also be hierarchical in structure. For example, the SIB or dedicated control channel may classify a subframe as a legacy subframe, such as Release-8, or not a legacy subframe, or supporting or not supporting a specific number of antennas. Further signaling information embedded within the non-legacy subframes may further identify the applicable type non-legacy subframe.

A downlink control region size when supplemental CRS patterns are mapped may be a set number of OFDM symbols, such as three. Alternatively, a format indicator, such as the currently unused physical control format indicator channel (PCFICH) state 3, may indicate which subframes support supplemental CRS while the other states 0, 1, 2 indicate the legacy CRS patterns signaled. The format indicator may be reserved for use by or unused by the population of legacy terminals. The control regions size may be semi-statically established to a set number of OFDM symbols when supplemental CRS patterns are present, such as 3. The control region size of the set number may be assumed when the PCFICH state is 3 or the signaled subframe indicator, such as the special subframe style bitmap, indicates a supplemental CRS subframe.

The legacy set of transmission antennas 110 may be represented by a legacy set of CRS patterns. The supplemental set of transmission antennas 112 may be represented by a supplemental set of CRS patterns. The base station 102 may map the supplemental set of common reference symbols to an unassigned set of subframe symbols, a previously assigned set of legacy common reference symbols, a combination of unassigned subframe symbols and previously assigned legacy common reference symbols, a set of physical resource blocks, or a set of control channel elements. An unassigned set of subframe symbols may be a set of subframe symbol not assigned a legacy set of common reference symbols. The base station 102 may map the supplemental set of common reference symbols by puncturing legacy code symbols.

FIG. 5 illustrates, in a block diagram, a traditional CRS mapping of an OFDM signal 500 broadcast from a four transmission antenna configuration. The signal 500 may be divided along the time domain into slots 502 and along the frequency domains into resource blocks (RBs) 504. In one embodiment, each RB 504 may have 12 resource elements. In one embodiment, each slot 502 may have seven OFDM symbols 506. Symbols 0 through 2 may be assigned as control symbols 508 and symbols 3 through 7 may be assigned as data symbols.

The first CRS 510, referencing the first transmission antenna, may be mapped to symbol 0 at resource elements 1 and 7 and symbol 4 at resource elements 4 and 10. The second CRS 512, referencing the second transmission antenna, may be mapped to symbol 0 at resource elements 4 and 10 and symbol 4 at resource elements 1 and 7. The third CRS 514, referencing the third transmission antenna, may be mapped to symbol 1 at resource elements 1 and 7. The fourth CRS 516, referencing the fourth transmission antenna, may be mapped to symbol 1 at resource elements 4 and 10.

FIG. 6 illustrates, in a block diagram, a first embodiment of CRS mapping of an OFDM signal 600 broadcast from an eight transmission antenna configuration. The legacy set of transmission antennas may be mapped as shown in FIG. 5. The network base station 102 may map the supplemental set of common reference symbols into the control region. The fifth CRS 602, referencing the fifth transmission antenna, may be mapped to symbol 2 at resource elements 1 and 7. The sixth CRS 604, referencing the sixth transmission antenna, may be mapped to symbol 2 at resource elements 4 and 10. The seventh CRS 606, referencing the seventh transmission antenna, may be mapped to symbol 2 at resource elements 2 and 8. The eighth CRS 608, referencing the eighth transmission antenna, may be mapped to symbol 2 at resource elements 5 and 11.

FIG. 7 illustrates, in a block diagram, a second embodiment of CRS mapping of an OFDM signal 700 broadcast from an eight transmission antenna configuration. The legacy set of transmission antennas may be mapped as shown in FIG. 5. The fifth CRS 602, referencing the fifth transmission antenna, may be mapped to symbol 2 at resource elements 1 and 7. The sixth CRS 604, referencing the sixth transmission antenna, may be mapped to symbol 2 at resource elements 4 and 10. The seventh CRS 606, referencing the seventh transmission antenna, may be mapped to symbol 3 at resource elements 1 and 7. The eighth CRS 608, referencing the eighth transmission antenna, may be mapped to symbol 3 at resource elements 4 and 10.

FIG. 8 illustrates, in a block diagram, a third embodiment of CRS mapping of an OFDM signal 800 broadcast from an eight transmission antenna configuration. The legacy set of transmission antennas may be mapped as shown in FIG. 5. The network base station 102 may map the supplemental set of common reference symbols into the data region. The fifth CRS 602, referencing the fifth transmission antenna, may be mapped to symbol 6 at resource elements 1 and 7. The sixth CRS 604, referencing the sixth transmission antenna, may be mapped to symbol 6 at resource elements 4 and 10. The seventh CRS 606, referencing the seventh transmission antenna, may be mapped to symbol 6 at resource elements 2 and 8. The eighth CRS 608, referencing the eighth transmission antenna, may be mapped to symbol 6 at resource elements 5 and 11. This embodiment may avoid any impact on the control region. The base station 102 may alternately map CRS patterns to symbol 5. The base station 102 may forgo explicit signaling in this embodiment, relying instead on rate matching to avoid link degradation due to symbols punctured by the CRS pattern.

FIG. 9 illustrates, in a block diagram, a fourth embodiment of CRS mapping of an OFDM signal 900 broadcast from an eight transmission antenna configuration. The legacy set of transmission antennas may be mapped as shown in FIG. 5. The fifth CRS 602, referencing the fifth transmission antenna, may be mapped to symbol 2 at resource elements 1 and 7. The sixth CRS 604, referencing the sixth transmission antenna, may be mapped to symbol 2 at resource elements 4 and 10. The seventh CRS 606, referencing the seventh transmission antenna, may be mapped to symbol 6 at resource elements 1 and 7. The eighth CRS 608, referencing the eighth transmission antenna, may be mapped to symbol 6 at resource elements 4 and 10.

The base station 102 may insert the CRS patterns for the supplemental set of transmit antennas into reserved physical resource blocks (PRBs) that may span the bandwidth of the LTE carrier. Subframes with reserved PRBs for CRS may be signaled with either a PCFICH state 3, the special subframe type bitmap, or other indication. However, overhead may be larger than the sparse mapping used when CRS are instead mapped to OFDM symbols. To reduce overhead with the CRS to PRB mapping approach then a distributed allocation may be used such that both data and CRS occupy individual PRBs. For example, a base station 102 may encode an individual PRB with a transmission signal for a legacy user device or a non-legacy user device. Alternatively, CRS-bearing PRBs may be scheduled to cover the entire frequency band, or a sub-portion thereof, in successive subframes or transmission intervals.

FIG. 10 illustrates, in a block diagram, one embodiment of an alternating CRS mapping of an OFDM signal 700 broadcast from an eight transmission antenna configuration. In this configuration, only the supplemental set CRSs, for example, the fifth through eighth transmission CRSs, are mapped. The fifth CRS 602, referencing the fifth transmission antenna, may be mapped to symbol 0 at resource elements 1 and 7 and symbol 4 at resource elements 4 and 10. The sixth CRS 604, referencing the sixth transmission antenna, may be mapped to symbol 0 at resource elements 4 and 10 and symbol 4 at resource elements 1 and 7. The seventh CRS 606, referencing the seventh transmission antenna, may be mapped to symbol 1 at resource elements 1 and 7. The eighth CRS 608, referencing the eighth transmission antenna, may be mapped to symbol 1 at resource elements 4 and 10.

FIG. 11 illustrates, in a block diagram, one embodiment of a CRS mapping 1100 to a PRB for an eight transmission antenna configuration. The base station 102 may transmit two slots 502 per millisecond, each slot having seven PDSCH OFDM symbols 1102. The first three PDSCH OFDM symbols 1102 per millisecond may be reserved as a control region and legacy CRS region 1104. The legacy antenna CRS pattern 1106 may be mapped to the fifth PDSCH OFDM symbol of each slot. Every fourth resource block, starting with the first resource block, may be reserved as a CRS resource block 1108 for the supplemental set of transmission antennas.

The base station 102 may map the CRS for the supplemental transmission antennas into a set of reserved control channel elements (CCEs) in the downlink control region. For four supplemental transmission antennas and by reserving six CCEs, then fifty-four REs per antenna may be available for the corresponding CRS. The base station 102 may signal subframes with the reserved CCEs for CRS with either PCFICH state 3 or with the special subframe type bitmap. The base station 102 may semi-statically set the size of the control region to 3 OFDM symbols. The number of CCEs left for physical downlink control channels (PDCCHs) elements may still be enough to service or almost service the required number of UEs per subframe to achieve maximum spectral efficiency for bandwidth modes of 5 MHz and greater.

FIG. 12 illustrates, in a block diagram, one embodiment of a CRS mapping 1200 to a CCE for an eight transmission antenna configuration. The first and second OFDM symbol 506 may each have two six resource element CCEs 1202 per resource block 506. The third OFDM symbol 506 may have three four resource element CCEs 1204 per resource block 506. The supplemental set CRSs representing the supplemental set of transmission antennas 112 may be included in either the first type of CCEs 1202 or the second type of CCEs 1204.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for transmitting data on an orthogonal frequency-division multiplexing carrier, comprising:
    transmitting a signal decodable by a legacy user communication device designed for compatibility with a legacy set of transmission antennas;
    encoding a sub frame of the signal with a legacy set of common reference symbols and a supplemental set of common reference symbols referring to a set of transmission antennas.

2. The method of claim 1, further comprising:
    mapping at least one common reference symbol of the supplemental set of common reference symbols to at least one unassigned subframe symbol.

3. The method of claim 1, further comprising:
    mapping at least one common reference symbol of the supplemental set of common reference symbols to at least one previously assigned legacy common reference symbol.

4. The method of claim 2, wherein at least one subframe symbol of the supplemental set of subframe symbols is in a control region of the subframe.

5. The method of claim 2, wherein at least one subframe symbol of the supplemental set of subframe symbols is in a data region of the subframe.

6. The method of claim 5, further comprising:
    encoding data for a non-legacy user device to the at least one physcial resource block.

7. The method of claim 1, further comprising:
    mapping a common reference symbol of the supplemental set of common reference symbols to at least one physical resource block.

8. The method of claim 1, further comprising:
    mapping a common reference symbol of the supplemental set of common reference symbols to at least one control channel element.

9. The method of claim 1, wherein an indication of the supplemental set of common reference symbols is encoded in at least one of a system information block or a physical control format indicator channel.

10. The method of claim 1, further comprising:
    mapping at least one common reference symbol of the supplemental set of common reference symbols by puncturing a legacy code symbol.

11. The method according to claim 1, wherein encoding comprises encoding a subframe of the signal with a legacy set of common reference symbols at resource elements specified by a Long Term Evolution standard and encoding a supplemental set of common reference symbols referring to the set of transmission antennas.

12. A base station for transmitting data on an orthogonal frequency-division multiplexing carrier, comprising:
    an antenna array that transmits a signal decodable by a legacy user communication device designed for compatibility with a legacy set of transmission antennas; and
    a processor that encodes a subframe of the signal with a legacy set of common reference symbols and a supplemental set of common reference symbols referring to the antenna array.

13. The base station of claim 12, wherein the processor maps the supplemental set of common reference symbols to an unassigned set of subframe symbols.

14. The base station of claim 12, wherein the processor maps a common reference reference symbol of the supplemental set of common reference symbols to a physical resource block and encodes data for non-legacy user device to the at least one physical resource block.

15. The base station of claim 12, further comprising:
    encoding an indication of the supplemental set of common reference symbol into the signal.

16. The base station of claim 15, wherein the indication is encoded in at least one of a system information block or a physical control format indicator channel.

17. A user communication device for receiving data on an orthogonal frequency-division multiplexing carrier, comprising:
    a transceiver that receives, from an antenna array, a signal decodable by a legacy user communication device designed for compatibility with a legacy set of transmission antennas; and
    a processor that decodes a subframe of the signal from a legacy set of common reference symbols and a supplemental set of common reference symbols referring to the antenna array.

18. The user communication device of claim 17, wherein the processor decodes from the signal an indication of a supplemental set of common reference symbol and decodes from a subframe of the signal a legacy set of common reference symbols referring to four transmission antennas and the supplemental set of common reference symbols referring to a set of transmission antennas.

19. The user communication device of claim 18, wherein the supplemental set of common reference symbols are mapped to an unassigned set of subframe symbols.

20. The user communication device of claim 18, wherein a common reference symbol of the supplemental set of common reference symbols are mapped to a physical resource block.

21. The user communication device of claim 18, wherein a common reference symbol of the supplemental set of common reference symbols are mapped to a control channel element.

* * * * *